United States Patent
Faught et al.

(10) Patent No.: US 9,280,373 B1
(45) Date of Patent: Mar. 8, 2016

(54) DATA TRANSFER GUIDE

(71) Applicant: IntelliCorp Inc., Santa Clara, CA (US)

(72) Inventors: Bill Faught, Sunnyvale, CA (US); Christopher Trueman, Bristol (GB)

(73) Assignee: IntelliCorp Inc., Santa Clara, CA (US)

( * ) Notice: Subject to any disclaimer, the term of this patent is extended or adjusted under 35 U.S.C. 154(b) by 181 days.

(21) Appl. No.: 14/055,529

(22) Filed: Oct. 16, 2013

Related U.S. Application Data

(60) Provisional application No. 61/714,678, filed on Oct. 16, 2012.

(51) Int. Cl.
G06F 9/455 (2006.01)

(52) U.S. Cl.
CPC .................. *G06F 9/45533* (2013.01)

(58) Field of Classification Search
None
See application file for complete search history.

(56) References Cited

U.S. PATENT DOCUMENTS

| | | | |
|---|---|---|---|
| 7,197,500 B1 * | 3/2007 | Israni et al. | 707/809 |
| 2003/0145055 A1 * | 7/2003 | Henke | 709/205 |
| 2006/0080554 A1 * | 4/2006 | McDonald et al. | 713/189 |
| 2006/0179061 A1 * | 8/2006 | D'Souza et al. | 707/10 |
| 2006/0206507 A1 * | 9/2006 | Dahbour | 707/100 |
| 2006/0212846 A1 * | 9/2006 | O'Farrell et al. | 717/116 |
| 2007/0088754 A1 * | 4/2007 | Brannon et al. | 707/200 |
| 2007/0168813 A1 * | 7/2007 | El Far et al. | 714/738 |
| 2008/0082834 A1 * | 4/2008 | Mattsson | 713/189 |
| 2008/0256250 A1 * | 10/2008 | Wakefield | 709/229 |
| 2009/0259618 A1 * | 10/2009 | Shi et al. | 707/2 |
| 2010/0058290 A1 * | 3/2010 | Williamson | 717/106 |
| 2010/0114841 A1 * | 5/2010 | Holenstein et al. | 707/690 |
| 2010/0199058 A1 * | 8/2010 | Szowa et al. | 711/171 |
| 2011/0138366 A1 * | 6/2011 | Wintergerst et al. | 717/130 |
| 2012/0179726 A1 * | 7/2012 | Roberts | 707/798 |
| 2012/0221519 A1 * | 8/2012 | Papadomanolakis et al. | 707/615 |
| 2013/0110788 A1 * | 5/2013 | Gong | 707/667 |
| 2013/0262390 A1 * | 10/2013 | Kumarasamy et al. | 707/649 |
| 2013/0262638 A1 * | 10/2013 | Kumarasamy et al. | 709/221 |
| 2013/0262801 A1 * | 10/2013 | Sancheti et al. | 711/162 |
| 2014/0067790 A1 * | 3/2014 | Lipin, Andrew | 707/714 |
| 2014/0095233 A1 * | 4/2014 | Yeung et al. | 705/7.12 |
| 2014/0143525 A1 * | 5/2014 | Taylor et al. | 712/227 |
| 2014/0222759 A9 * | 8/2014 | Varadharajan et al. | 707/639 |

* cited by examiner

*Primary Examiner* — Emerson Puente
*Assistant Examiner* — Mehran Kamran
(74) *Attorney, Agent, or Firm* — Van Pelt, Yi & James LLP

(57) ABSTRACT

Techniques to create and use a data transfer guide are disclosed. In various embodiments, at least a portion of application code comprising an application is executed in a virtual machine execution environment. An interaction between the application code executing in the virtual machine execution environment with a data entity included in a set of production data is observed programmatically. A data that represents the data entity is included in a data transfer guide at least in part programmatically.

17 Claims, 9 Drawing Sheets

DATA TRANSFER GUIDE

CROSS REFERENCE TO OTHER APPLICATIONS

This application claims priority to U.S. Provisional Patent Application No. 61/714,678 entitled DATA TRANSFER GUIDE filed Oct. 16, 2012 which is incorporated herein by reference for all purposes.

BACKGROUND OF THE INVENTION

Information Systems combine process and data into a single operating unit to support a wide variety of functions including, for example, transaction process systems, management information systems, decision support systems, executive information systems, data warehouses, enterprise resource planning, enterprise systems, expert systems, geographic information systems, global information systems and office automation. Organizations implement automated information systems are for the purpose of improving the effectiveness and efficiency of that organization.

Information Systems may be organized into "landscapes" of component systems that help manage the flow of function and data change. A common landscape includes:
- Production—essential to the daily operations support of an organization
- Support—operations support, source of emergency production corrections
- Testing—change validation system
- Training—end-user training
- Development—change development system
- Sandbox—experimental change system FIG. 1 is a block diagram that shows how the landscape may be organized to support the flow of function and data change. In the example shown, information system 100 includes a production (or "live") system 102 used to provide daily data processing and related services, for example to an enterprise or other organization and/or its downstream consumers or other users. A support organization and associated infrastructure 104 provides support to the daily operations performed using the production system 102. A test component 106 may be used by the support organization, for example to troubleshoot and/or test fixes applied to production system 102. Test component 106 may also be used to support a training organization and/or infrastructure 108, which may be used to train users of production system 102, for example. A development component 110 may be used to develop and ready for deployment to production system 102, after testing and training for example using test component 106 and training infrastructure 108, changes to the application code or other code deployed on production system 102. Development component 110 may be used in the example shown to develop for deployment experimental changes first investigated using a sandbox component 112, which enables code to be written and executed in a secure environment well isolated from production system 102.

Data quality may vary considerably across a typical landscape's component systems. The best data may be termed "production-grade" as it is contained in the production component system, such as production system 102 of FIG. 1. This system is used to support everyday operations of the organization. Its functions are most frequently used and in the most varied of usage scenarios. Therefore, its data is of the highest quality, reflecting the full and varied uses cases that the Information System has been implemented by the organization to support.

The three key reasons for poorer data quality in the other component systems are: (i) production data is larger now than at any point in history: copying terabytes of data between systems is too slow, too disruptive and too expensive; (ii) production data invariably contains confidential data that should not be copied unless securely masked; (iii) information needed to ensure the full integrity of data copied between component systems is hidden in the application logic that makes up the function elements of the Information System.

But without access to production-grade data, testing, training, development and even experimental component systems suffer a reduction in quality. Information Systems combine function and data into a single operating unit. Functions that operate on poor-quality data may give poor-quality results.

In short, there is significant quality advantage to be gained from access to production-grade data across the Information System landscape, but significant challenges (size, time, cost, security and integrity) work against achieving this goal.

BRIEF DESCRIPTION OF THE DRAWINGS

Various embodiments of the invention are disclosed in the following detailed description and the accompanying drawings.

DETAILED DESCRIPTION

Figure 1:
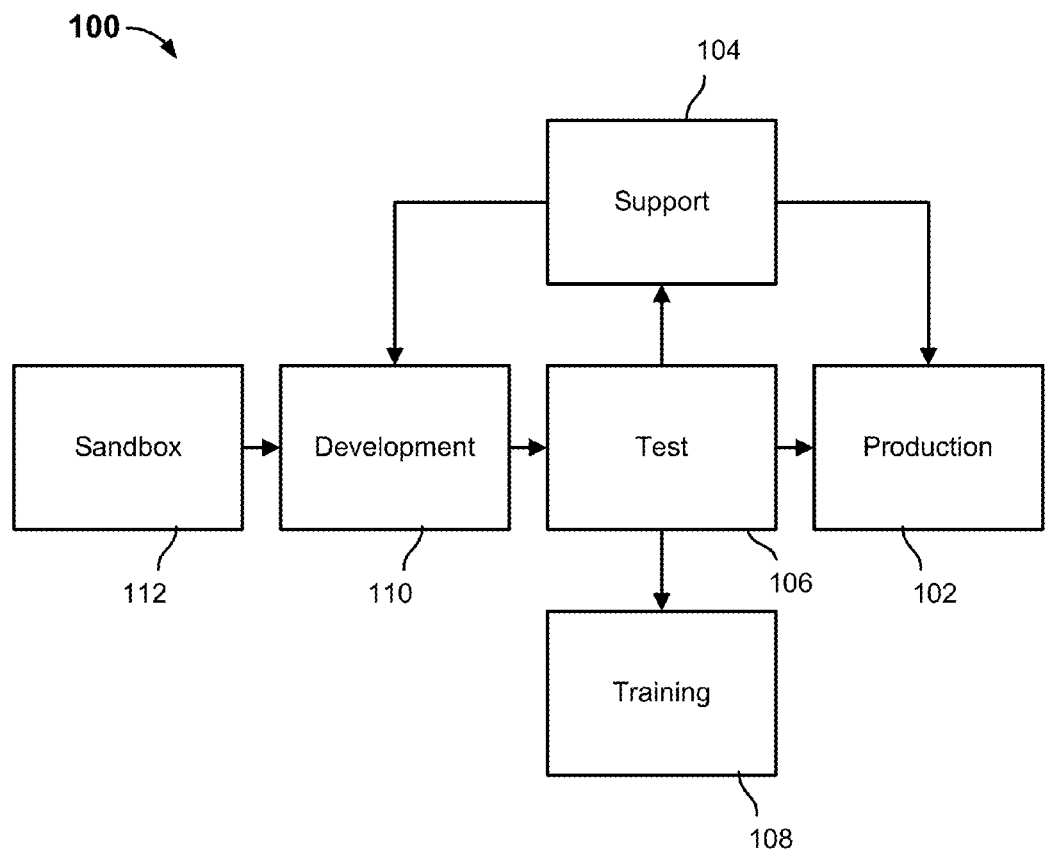
FIG. 1 is a block diagram that shows how the landscape may be organized to support the flow of function and data change.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automated generation of a data transfer guide that captures and expresses data entity relationships associated with an application is disclosed. In various embodiments, application code execution is observed. Application interaction with production data entities, and relationships between such entities, e.g., relationships defined and/or enforced by and/or otherwise embodied in application logic, are observed and represented in the data transfer guide. In various embodiments, the data transfer guide may be used to transfer a minimally required subset of production data, for example a subset determined based on the data transfer guide to be minimally sufficient to enable all or a selected subset of application code execution paths to be exercised using production data in the subset.

Information Systems combine function and data into a single operating unit. For simple applications the data may be composed of tens of entities. In the largest enterprise resource planning information systems the count of entities may run into hundreds of thousands. Enforcing referential integrity between all the entities is a complex problem.

Some Information Systems rely on the underlying physical storage system, often a relational database management system, to enforce integrity. This is a common feature of such systems where a constraint may be codified that associates, for example, sales orders with sales order line items, such that attempts to delete the sales order without first deleting the sales order line items results in an error.

Such systems maintain a record of the referential links and these links may be used to direct a data copy operation between component systems of the Information System landscape resulting in a full integrity copy. Other systems manage the referential integrity in the application logic (program) itself. In such cases there is no "external" representation of the relationships between the entities and thus the problem of copying data between systems with full integrity is complicated significantly. Automated generation of a "data transfer guide" comprising data that documents the entity relations and enables a full integrity copy of data between systems is disclosed.

Figure 2:
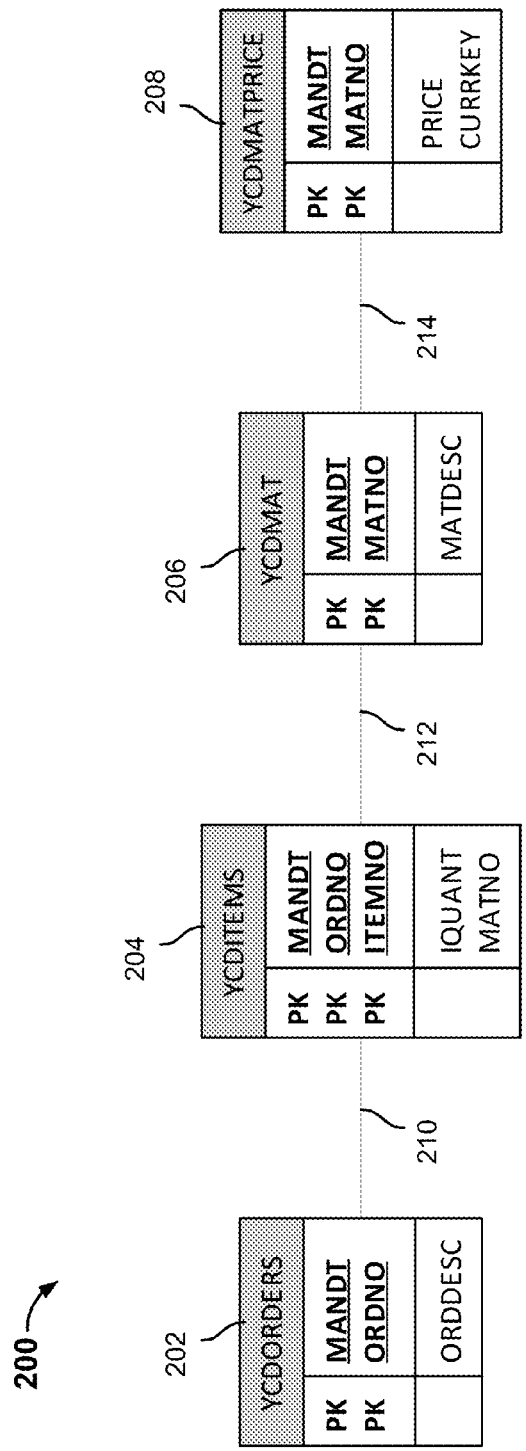
FIG. 2 is a block diagram illustrating an example of an entity relationship diagram.

FIG. 2 is a block diagram illustrating an example of an entity relationship diagram. Using the language of relationship databases, each box in the example shown in FIG. 2 refers to a table. A table is a container of data and is made of up a columns, where each column stores a characteristic of the data, and rows where each row represents a single entity. Columns may be annotated with further information such as the column data type (integer, string, etc.) and whether the column forms part of the primary key—the unique set of columns by which a single entity may be uniquely identified in the set of rows.

In the example shown in FIG. 2 there are four tables: YCDORDERS, YCDITEMS, YCDMAT and YCDMAT-PRICE, represented in FIG. 2 by entities 202, 204, 206, and 208, respectively. The YCORDERS table captures header information including the client number (MANDT), order number (ORDNO), and order description (ORDDESC). The client number and order number are marked as the primary key. This means that any row in the YCDORDERS table may be uniquely identified by the set (MANDT, ORDNO).

The YCDITEMS table stores order item details including the client number, order number, item number, item quantity (IQUANR) and material (MATNO). Intuition tells us that every row in the YCDITEMS table is linked (via the MANDT and ORDERNO columns) with a record in the YCDORDERS table. And this relationship is highlighted in the diagram by the line 210 connecting the two tables. Some systems capture this intuition in the form of a referential integrity constraint that is enforced. Other systems enforce the relationship in their application logic.

The YCDMAT and YCDMATPRICE are similarly defined and a referential relationship (212, 214) exists between them and between the YCDITEMS and YCDMAT tables.

Techniques are disclosed to extract the referential relationships by executing the application logic in a controlled virtual machine to produce a Data Transfer Guide that may be used to support the copy, with full integrity, of data between component systems of an Information System landscape. Components of the system in various embodiments include a flexible data masking system to protect confidential data.

Figure 3:
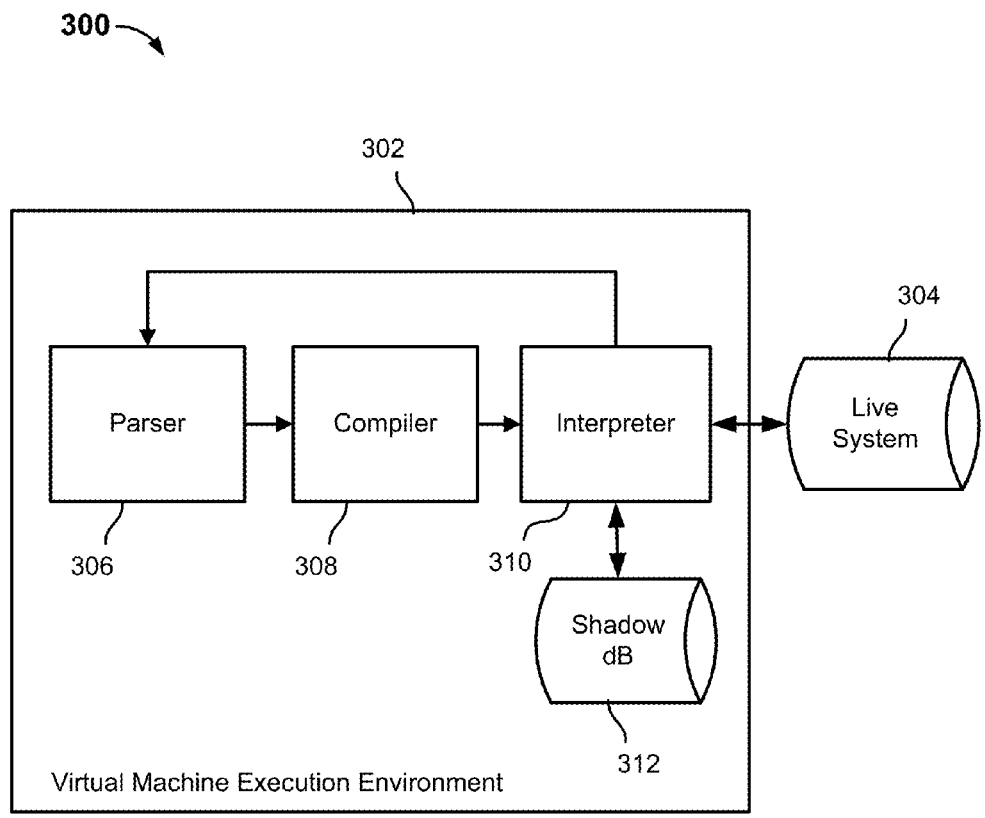
FIG. 3 is a block diagram illustrating an embodiment of a system to generate a data transfer guide.

FIG. 3 is a block diagram illustrating an embodiment of a system to generate a data transfer guide. In the example shown, the system 300 includes a virtual machine execution environment 302 associated with a live (production) system 304. Operating systems have been virtualized to make better use of the available computing resources. Virtualizing the operating system also provides further separation of concerns allowing for the deployment of information system "appliances"—systems designed for a single purpose.

Computer programming environments have increasingly adopted the virtual machines to insulate the programming language (and its users) from the details of machine architectures. In various embodiments, the virtual machine promises a "write once, run anywhere" solution for the computer programmer. Two widely used computer program virtual machines are the Java and .NET.

In various embodiments, the virtual machine defines a system capable of duplicating the execution of a live information system's programs for the purpose of discovering the data elements used by the programs and more specifically the relationships between the data elements.

Executing the application logic in a virtual environment provides two benefits:
1) The live system is not changed by the virtual execution.
2) The application logic maintained referential relationships are turned into a Data Transfer Guide that supports the copy, with full integrity, of data between systems to support common lifecycle actions such as Development, Testing, Training and Support.

The virtual machine 302 in various embodiments includes a parser 306, a compiler 308, an interpreter 310, and a shadow database 312. The virtual machine 302 in the example shown in FIG. 3 also maintains a connection to the live system 304.

The parser 306, compiler 308, and interpreter 310 in various embodiments together provide the environment for executing the application program logic in the virtual machine 302. Code is requested on-demand (in some embodiments an optimizing cache implemented in the interpreter reduces demand load) by the interpreter 310. Assuming a cache miss, the code is passed to the parser 306 before the compiler 308 generates a bytecode or other intermediate representation that is interpreted by interpreter 310.

For each executed program element, in various embodiments the data transfer guide maintained by the virtual machine is updated with the set of elements used by that element and the relationships between them.

The following pseudo-code example shows how a program may be linked to data elements. The code also shows how relationships between data elements may be expressed.

```
1 REPORT SALES_ORDER_REPORT
2 DATA:
3 ORDER_HEADER TABLE ORDER_HEADERS
4 ORDER_LINE_ITEM TABLE ORDER_LINE_ITEMS
5 LOGIC:
6 SELECT*FROM ORDER_HEADER
7 SELECT*FROM ORDER_LINE ITEM WHERE OWNER=ORDER_HEADER.ID
8 ENDSELECT
9 ENDSELECT
```

The pseudo-code above associates ORDER_LINE_ITEM records with ORDER_HEADER records. Line 6 uses a SQL SELECT statement to read all the records from the ORDER_HEADER table. An iteration of the returned records begins. Line 7 reads all the associated ORDER_LINE_ITEM data by matching the ORDER_LINE_ITEM "OWNER" column value to the ORDER_HEADER "ID" column value (see the WHERE clause of line 7's SELECT statement).

Application program logic typically contains numerous data calls, e.g., calls to create, read, update, and/or delete data, which in various embodiments are intercepted by the virtual machine 302, specifically the interpreter component 310 as it executes the application logic. To prevent contamination, in various embodiments no data changes are submitted to the live system 302. Instead the effects of these operations are captured in a shadow data store such as shadow database 312 of FIG. 3. In this way the combination of the live and shadow system reflects the date state of the execution application program logic. In various embodiments, the shadow data is discarded on production of the final Data Transfer Guide.

Figure 4:
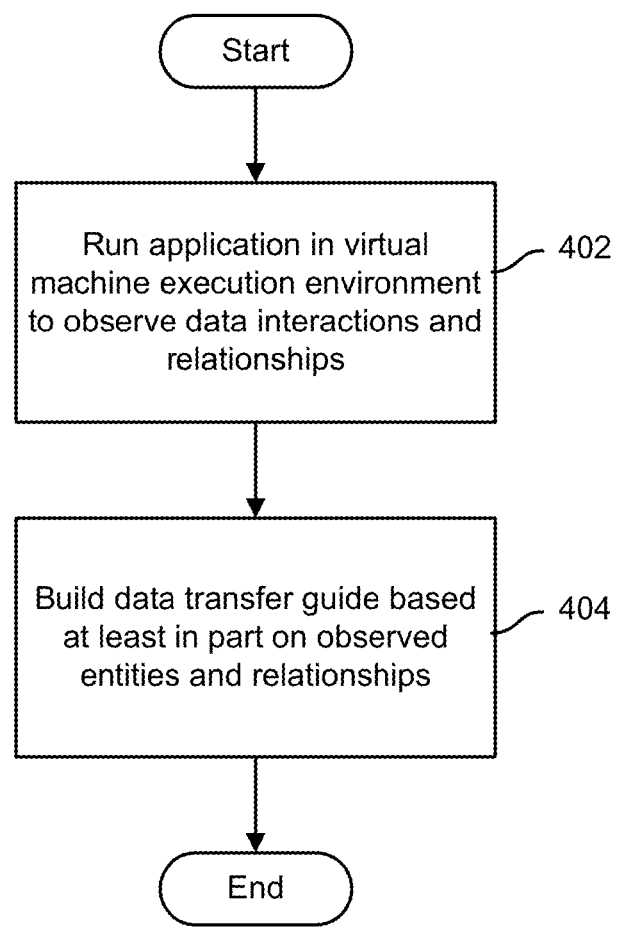
FIG. 4 is a flow chart illustrating an embodiment of a process to generate a data transfer guide.

FIG. 4 is a flow chart illustrating an embodiment of a process to generate a data transfer guide. In various embodiments, all or part of the process of FIG. 4 may be implemented using an interpreter component, such as interpreter 310 of FIG. 3. In the example shown, application code is executed in a virtual machine execution environment and data interactions and relationships are observed and noted (402). A data transfer guide that embodies and/or otherwise represents such entities and relationships is built, based at least in part on the observations (404).

Figure 5:
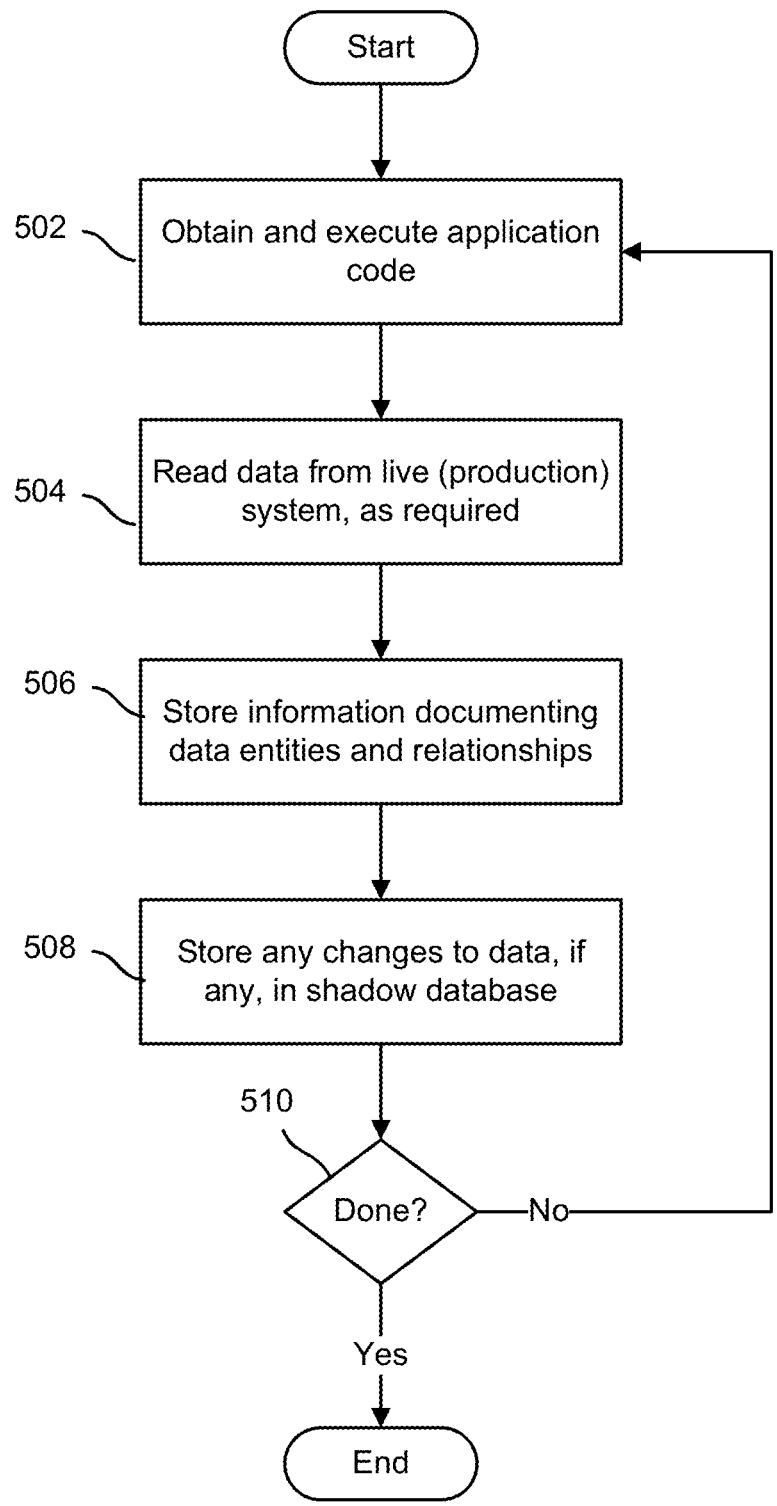
FIG. 5 is a flow chart illustrating an embodiment of a process to execute application code in a virtual environment.

FIG. 5 is a flow chart illustrating an embodiment of a process to execute application code in a virtual environment. In various embodiments, the process of FIG. 5 is used to implement 402 of FIG. 4. In the example shown, application code is obtained and executed (502), e.g., in a virtual machine execution environment. For example, at the outset an initial segment of application code may be obtained and executed. Data is read from the live (e.g., production) system, as/if required by the executing application code (504). Data documenting data entities interacted with by the application code, and relationships between them, is stored (506), for example for later use to generate a final data transfer guide. Any changes the application code attempts to make to production data, if any, are instead made only in a shadow data store (508). Once all application code (or a subset thereof that is of interest) has been executed (510), the process of FIG. 5 ends.

Figure 6:
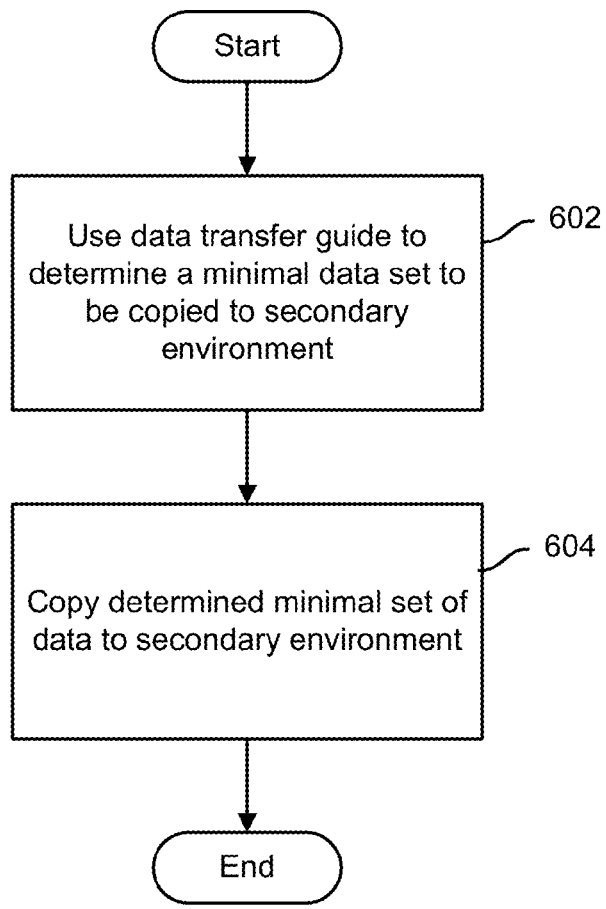
FIG. 6 is a flow chart illustrating an embodiment of a process to copy production data.

FIG. 6 is a flow chart illustrating an embodiment of a process to copy production data. In the example shown, a data transfer guide, e.g., one create as disclosed herein, is used to determine a set of production (live system) data to be copied to a secondary environment, such as another component in an information system and/or landscape with which the production (live) system is associated (602). In some embodiments, the data transfer guide may be used to determine a set of production data that is at least minimally sufficient for some purpose, e.g., to exercise an application code and/or elements thereof via a desired set of execution paths. The determined set of production data is copied to the secondary environment and/or location (604). In various embodiments, all or part of the process of FIG. 6 may be automated, fully or partially. For example, in some embodiments the data transfer guide may be expressed in a machine readable format, such as XML or another format, and maybe used to determine at least in part programmatically a set of production data to be copied. In various embodiments, for example, a set of records associated with an identified customer or subset of customers, one or more products and/or services, etc. may be received, for example from a human or other user, and data associated with those data entity instances and data records related directly or indirectly to such data entity instances, as determined at least in part from the data transfer guide, may be included at least in part programmatically in the set of data to be copied.

In some embodiments, to protect privacy and/or otherwise confidential data, data masking techniques may be used on data copied from a production (live) system. Data masking refers to techniques by which confidential application data is rendered anonymous. For example, data about an employee may contain their name, address, and salary details. In production systems, access to this data typically is rigorously controlled. When the data is copied to a secondary system, where different (less secure) access controls may be used, in various contexts it may be desired that the data characteristics that associate the confidential data with the real employee are hidden. In the example above, the name and address data may be changed so that it becomes impossible to associate the salary data with a real employee.

In various embodiments, data masking is implemented using a data mask system that provides a number of high-level choices that affect the masking algorithm. For example, data may be selected from an alternative database of anonymous data—useful for mapping employee and customer names. Alternatively, data may be generated to comply with rules that ensure that the data accurately reflects the state of production data.

Figure 7:
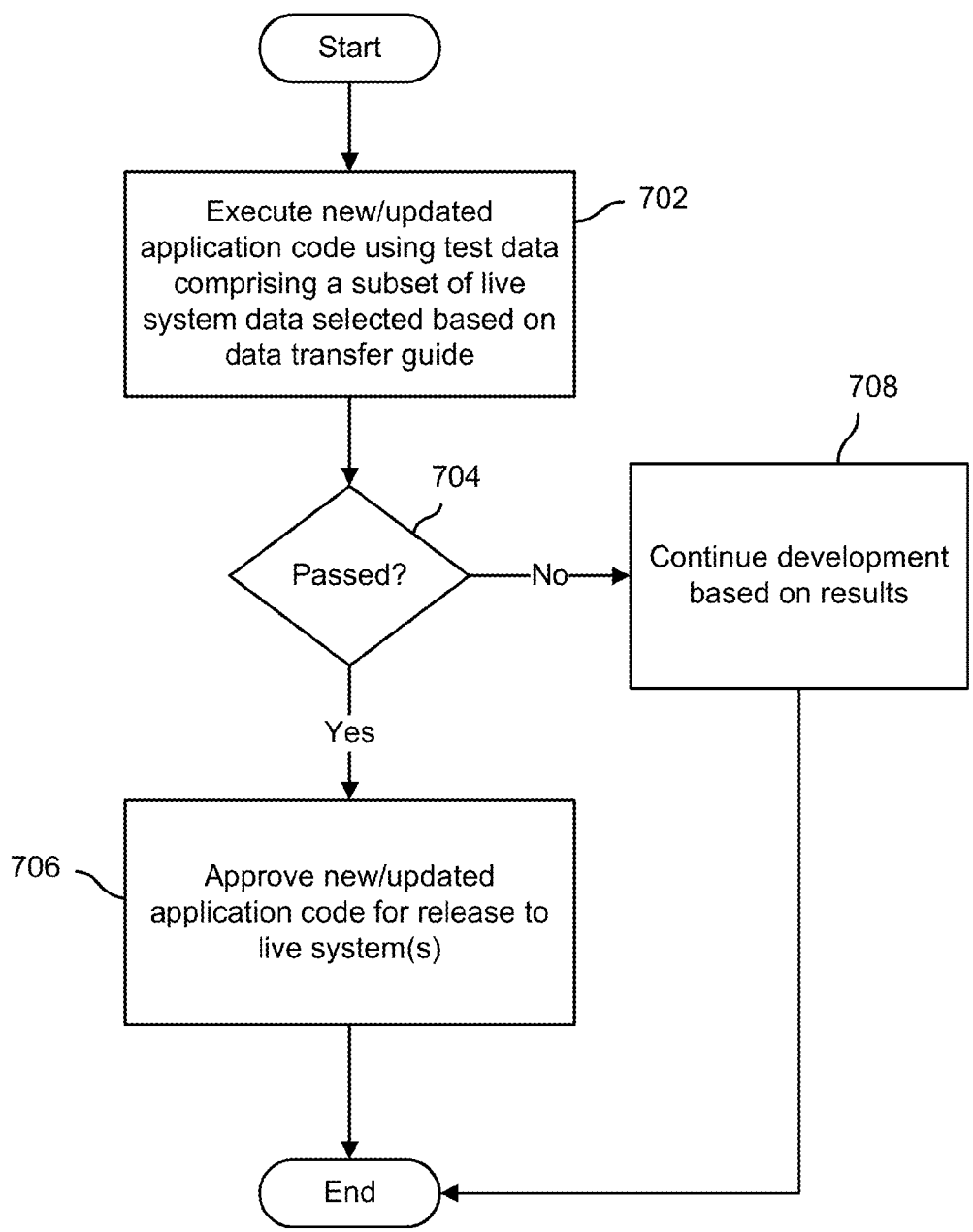
FIG. 7 is a flow chart illustrating an embodiment of an application software update development process.

FIG. 7 is a flow chart illustrating an embodiment of an application software update development process. In the example shown, new/updated application code is executed, for example in a virtual machine or other execution environment external to a live (production) system with which the application code is associated, using test data comprising at least a subset of data copied from the live (production) system, e.g., using a data transfer guide as disclosed herein (702). If the application code being executed is determined to have satisfied applicable quality assurance and/or other criteria (704), the new/updated application code is approved for release and deployment to the live (production) system (706). Otherwise, further development work is performed based on the testing results (708).

In some embodiments, new and/or updated application code may be executed in a virtual machine execution environment, and interactions by such application code with production data observed, to build a data transfer guide to be used to perform further development and/or testing.

In some embodiments, a data transfer guide as disclosed herein may form the basis of a change verification system. Whenever an information system is changed, actions are taken to verify that the change is correct. For example, an end-user may perform several operations using the information system to operate on data. By comparing the data-in and data-out the effect of the function may be verified. In various embodiments, a data transfer guide-powered change verification system is provided. The manual actions typically performed by an end-user in a typical change verification approach are in various embodiments replaced with automated action execution, comparison, and verification. In various embodiments, one or more of the execution, comparison, and verification are performed in a virtual machine or other execution environment, with changes to production data, if any, being persisted at least initially only in a shadow data store, as described herein.

Figure 8:
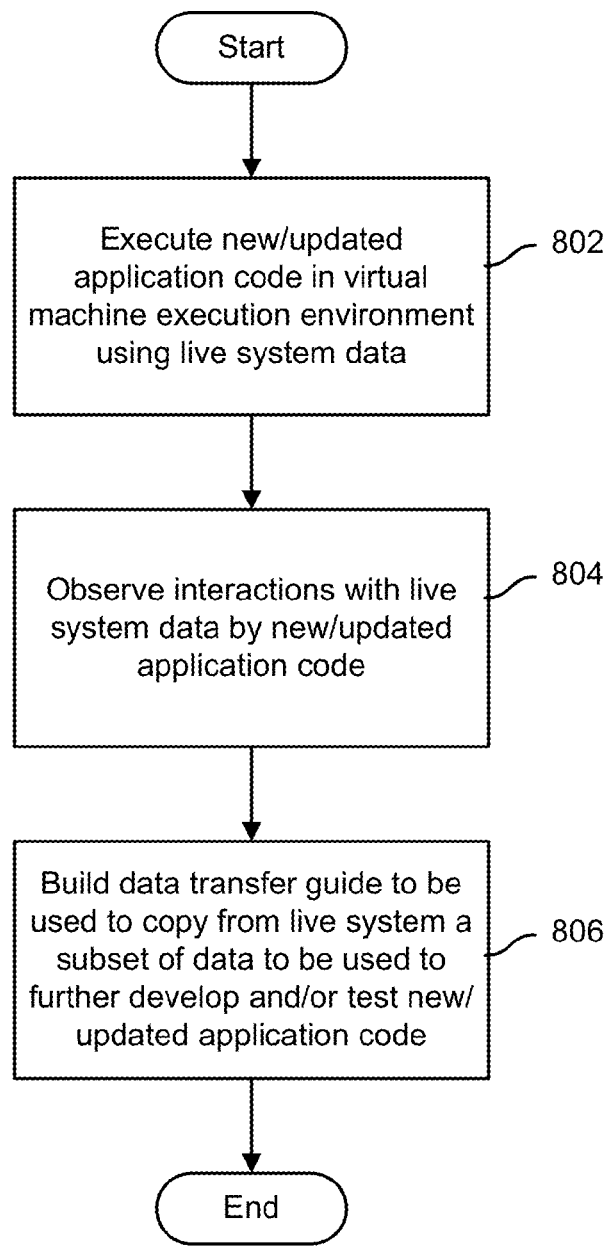
FIG. 8 is a flow chart illustrating an embodiment of a process to build a data transfer guide.

FIG. 8 is a flow chart illustrating an embodiment of a process to build a data transfer guide. In the example shown, new/updated application code is executed in a virtual machine execution environment using live (production) system data (802). In various embodiments, any changes to data are made only in a shadow data store, as described above. Interactions of the executing new/updated application code with live (production) system data are observed (804). A data transfer guide is built based at least in part on the observations (806), e.g., to enable a subset of production data to be identified and copied to a secondary system to be used in further development and/or testing of the new/updated application code.

Figure 9:
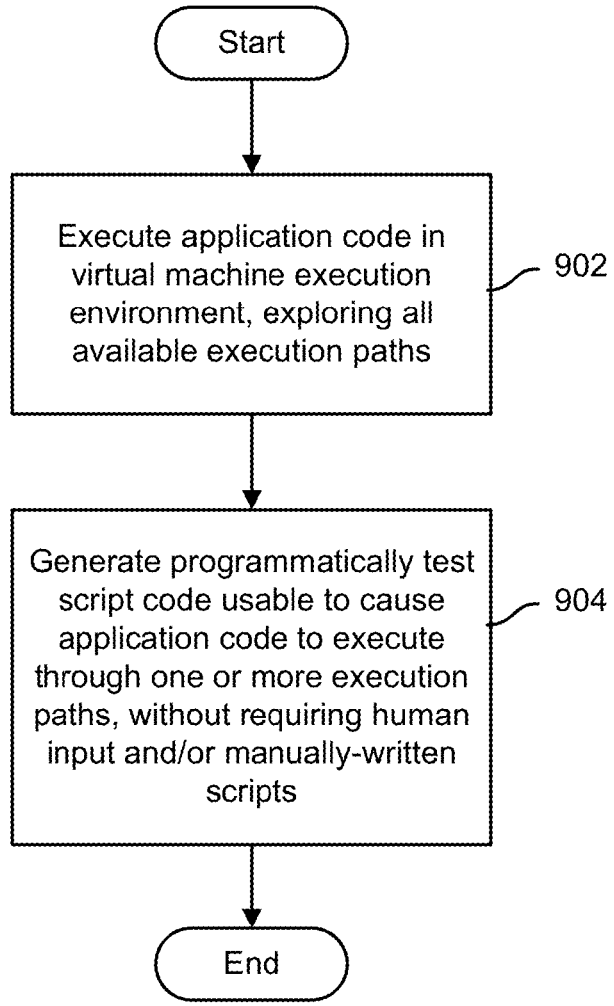
FIG. 9 is a flow chart illustrating an embodiment of a process to generate test scripts.

FIG. 9 is a flow chart illustrating an embodiment of a process to generate test scripts. In the example shown, application code is executed in a virtual machine execution environment (902), exploring all available (and/or in some embodiments a subset of interest of) execution paths. Interactions by human or other users with the application code which may be required to exercise the application code through its various execution paths are observed, and test script(s) required to cause the application code to execute through such execution paths is/are generated programmatically based at least in part on such observations (904). In various embodiments, test script generation as illustrated in FIG. 9 may be performed by executing application code in a virtual machine execution environment such as virtual machine execution environment 304 of FIG. 3. Changes made or attempted to be made to live (production) data in various embodiments are made only in a shadow data store, as described above.

Using techniques disclosed herein, a manageable and sufficient set of production data may be identified to be copied and used in a secondary system and/or environment to perform more robust development, testing, support, training, etc. with respect to application code associated with a live (production) system, providing a more reliable information system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
executing in a virtual machine execution environment at least a portion of application code comprising an application;
observing programmatically an interaction between the application code executing in the virtual machine execution environment with a data entity included in a set of production data;
determining a minimal subset of production data that is minimally sufficient to enable testing of the application code based on the observed interaction between the application code and the data entity;
including in a data transfer guide at least in part programmatically a data that represents the data entity;
determining that the application code executing in the virtual machine execution environment is attempting to make a change to a production data value associated with the data entity; and
storing data reflecting the change in a shadow data store associated with the virtual machine execution environment and not in the set of production data.

2. The method of claim 1, wherein the data entity comprises a first data entity and further comprising observing a relationship between the first data entity and a second data entity included in the set of production data.

3. The method of claim 2, further comprising representing the relationship in the data transfer guide.

4. The method of claim 1, further comprising using the data transfer guide to identify a subset of production data to be copied to a secondary location.

5. The method of claim 4, wherein the production data is associated with a production system comprising a first component of an information system and the secondary location comprises a second component of the information system.

6. The method of claim 4, wherein the subset of production data to be copied includes the minimal subset of production data that is determined based at least in part on the data transfer guide to be minimally sufficient to exercise at least a portion of application code that is of interest.

7. The method of claim 6, wherein the minimal subset of production data is determined based at least in part on the data transfer guide to be minimally sufficient to exercise a portion of the application code that is associated with one or more execution paths of interest.

8. The method of claim 4, further comprising copying the subset of production data to the secondary location.

9. The method of claim 8, further comprising performing data masking with respect to at least a portion of the subset of production data as stored in the secondary location.

10. The method of claim 1, wherein the portion of application code comprises a new or updated portion of application code, and further comprising using the data transfer guide to identify and copy a subset of production data to be used to do one or more of further develop and test the new or updated application code.

11. A system, comprising:
a memory or other data storage device; and
a processor coupled to the memory or other data storage device and configured to:
execute in a virtual machine execution environment at least a portion of application code comprising an application;
observe programmatically an interaction between the application code executing in the virtual machine execution environment with a data entity included in a set of production data;
determine a minimal subset of production data that is minimally sufficient to enable testing of the application code based on the observed interaction between the application code and the data entity;
include in a data transfer guide stored, at least in part programmatically, in the memory or other storage device a data that represents the data entity;
determine that the application code executing in the virtual machine execution environment is attempting to make a change to a production data value associated with the data entity; and store data reflecting the change in a shadow data store associated with the virtual machine execution environment and not in the set of production data.

12. The system of claim 11, wherein the data entity comprises a first data entity and further comprising observing a relationship between the first data entity and a second data entity included in the set of production data.

13. The system of claim 12, wherein the relationship is represented in the data transfer guide.

14. The system of claim 11, wherein the processor is further configured to use the data transfer guide to identify a subset of production data to be copied to a secondary location.

15. The system of claim 14, wherein the production data is associated with a production system comprising a first component of an information system and the secondary location comprises a second component of the information system.

16. The system of claim 14, wherein the subset of production data to be copied includes a minimal subset of production data that is determined based at least in part on the data transfer guide to be minimally sufficient to exercise at least a portion of application code that is of interest.

17. A computer program product, stored on a non-transitory computer readable storage medium, comprising computer instructions for:

executing in a virtual machine execution environment at least a portion of application code comprising an application;

observing programmatically an interaction between the application code executing in the virtual machine execution environment with a data entity included in a set of production data;

determining a minimal subset of production data that is minimally sufficient to enable testing of the application code based on the observed interaction between the application code and the data entity;

including in a data transfer guide at least in part programmatically a data that represents the data entity;

determining that the application code executing in the virtual machine execution environment is attempting to make a change to a production data value associated with the data entity; and storing data reflecting the change in a shadow data store associated with the virtual machine execution environment and not in the set of production data.

* * * * *